US008056965B2

(12) United States Patent
Rosemann et al.

(10) Patent No.: US 8,056,965 B2
(45) Date of Patent: Nov. 15, 2011

(54) STOP ARRANGEMENT AND METHOD FOR SETTING UP A STOP FOR TWO COMPONENTS THAT ARE MOVABLE WITH RESPECT TO EACH OTHER

(75) Inventors: Frank Rosemann, Münzenberg (DE); Harald Schaety, Wetzlar (DE)

(73) Assignee: Newfrey LLC, Newark, DE (US)

( * ) Notice: Subject to any disclaimer, the term of this patent is extended or adjusted under 35 U.S.C. 154(b) by 455 days.

(21) Appl. No.: 12/406,460

(22) Filed: Mar. 18, 2009

(65) Prior Publication Data

US 2009/0235486 A1 Sep. 24, 2009

(30) Foreign Application Priority Data

Mar. 18, 2008 (DE) ........................ 10 2008 015 579

(51) Int. Cl.
*B60J 5/00* (2006.01)
*E05F 5/02* (2006.01)

(52) U.S. Cl. ....................................... 296/207; 16/86 A

(58) Field of Classification Search .................. 296/207; 16/86 R, 86 A, 86 B; 24/DIG. 48; 411/550
See application file for complete search history.

(56) References Cited

U.S. PATENT DOCUMENTS

| | | | | |
|---|---|---|---|---|
| 6,088,878 | A * | 7/2000 | Antonucci et al. | 16/86 A |
| 6,119,306 | A * | 9/2000 | Antonucci et al. | 16/86 A |
| 2004/0025290 | A1* | 2/2004 | Novarino | 16/86 A |

FOREIGN PATENT DOCUMENTS

EP 1600590 A2 11/2005

* cited by examiner

*Primary Examiner* — Dennis Pedder
(74) *Attorney, Agent, or Firm* — Michael P. Leary

(57) ABSTRACT

A stop arrangement for forming an adjustable stop between a first component and a second component that are movable in relation to each other, in particular between a vehicle body and a flap hinge-connected to it, including a fastening element which is connected to the first component and has a first threaded portion, and including a stop part, which serves as a stop for the second component and has a second threaded portion, which can be brought into engagement with the first threaded portion in such a way that, by turning the stop part, the distance of the latter from the first component can be set.

15 Claims, 4 Drawing Sheets

STOP ARRANGEMENT AND METHOD FOR SETTING UP A STOP FOR TWO COMPONENTS THAT ARE MOVABLE WITH RESPECT TO EACH OTHER

CROSS-REFERENCE TO RELATED APPLICATIONS

This application claims the benefit of German Application No. 10 2008 015 579.9 filed Mar. 18, 2008, the disclosure of which is incorporated herein by reference.

FIELD OF THE INVENTION

The present invention relates to a stop arrangement for forming an adjustable stop between a first component and a second component that are movable in relation to each other, in particular between a vehicle body and a flap hinge-connected to it, comprising a fastening element which is connected to the first component and has a first threaded portion, and comprising a stop part, which serves as a stop for the second component and has a second threaded portion, which can be brought into engagement with the first threaded portion in such a way that, by turning the stop part, the distance of the latter from the first component can be set.

BACKGROUND ART

Such a stop arrangement is known, for example, from the document EP 1 600 590 A2.

The production of motor-vehicle bodies and body parts is subject to tolerances. On the other hand, one aim in the body making business is to avoid rattling. However, with a hinged connection of a flap such as a tailgate or an engine bonnet to a vehicle body, these tolerances may cause rattling to occur. It is accordingly desired to keep the flap in place on the body under a slight tension when it is in a closed state to prevent rattling noises. This takes place by providing adjustable stop arrangements on the body and/or on the flap to make it possible to compensate for the tolerances for each individual vehicle. This may involve providing a stop arrangement that comprises a buffer part or damping part which butts directly against the other component (for example against the body). Alternatively, it is possible to provide a stop arrangement that forms a fixed stop on one of the components and for the stop arrangement to be assigned a buffer element or damping element on the other component.

In the case of the stop arrangement that is known from the document EP 1 600 590 A2, a stop arrangement is formed by providing a body panel with a hole in which a cage with an internal thread is inserted. The cage is formed in the manner of a pot and extends to the inner side of the body part. A threaded stud that forms the stop can be screwed into the cage. The distance between the upper side of the threaded stud and the body can be set by turning the threaded stud. Furthermore, means for securing the position of the threaded stud set in this way are provided.

Against this background, it is one aspect of the invention to provide an improved stop arrangement and an improved method for setting up a stop for two components that are movable with respect to each other.

The above aspect may be achieved in the case of the stop arrangement according to the invention by the fastening element being formed as a stud which is rigidly joined to a surface of the first component.

Furthermore, the above aspect may be achieved by a method for setting up a stop for two components that are movable with respect to each other, comprising the steps of:

joining a stud having a first threaded portion to a surface of one of the components;

fixing a latching part to the stud;

screwing a stop part having a second threaded portion onto the stud, the stop part coming into latching engagement with the latching part; and turning the stop part on the stud in a latching manner until a desired height of the stop part with respect to the one component is achieved.

In the case of exemplary embodiment of the stop arrangement according to the invention and exemplary embodiment of the method according to the invention, a stop may be formed without it being necessary to provide an opening in the respective component. This allows problems with regard to sealing and corrosion to be avoided.

The stud can be connected to the respective component in any way desired, for example by adhesive bonding. For example, the stud may be joined to the surface of the component by the stud welding that is known in the prior art. It goes without saying here that the stud is formed from an electrically conductive material such as a metal.

Furthermore, the stop arrangement can be obtained with very few components, in the simplest case just with the stud and the stop part.

The stop part may be formed in the manner of a shroud and covers the stud.

In this way, the stop arrangement can be formed in an aesthetically attractive manner.

According to a another embodiment, the stop part may have a central portion, on which the second threaded portion is formed, and a shroud portion extending from it.

The central portion may, for example, be a screw portion, which is screwed into a threaded bore of the stud. The stud may be formed with an external thread and the central portion may be formed as a hollow portion with an internal thread.

The stop part may be designed in such a way that it does not touch the component in any screwed position, in order to avoid accumulations of water in this region. However, according to an exemplary embodiment, the shroud portion of the stop part may cover over a flange portion that is often provided on the stud, so that only the shroud-shaped stop part can be seen from the outside.

The fixing of the stop part with respect to the stud can take place in any way desired, for example by an adhesive, such as a delayed-curing adhesive.

In an exemplary embodiment, a latching part to which the stop part is fixed in a latching manner in the circumferential direction is rigidly fixed to the stud.

In the case of this embodiment, the stop arrangement can be obtained with only three components. The latching part can be rigidly fixed to the stud after the stud is joined onto the surface of the component. Then different latching positions in which the stop part is respectively fixed can be obtained between the stop part and the latching part during the turning of the stop part.

The stud may have a shank portion and a flange portion, which projects in the radial direction with respect to the shank portion, the latching part being fixed to the flange portion.

Such a flange portion is provided on the stud with preference between the shank portion and the joining location. Furthermore, the flange portion also extends in the radial direction with respect to the joining location and is kept at a distance from the component.

The latching part may have at least one latching nose which engages axially behind the flange portion.

In this way, the latching part can be fixed in the axial direction by a simple working step, to be specific by clipping onto the stud.

According to another embodiment, the flange portion and the latching part respectively have a twist-preventing contour, which act on each other in such a way that the latching part is fixed on the stud in the circumferential direction.

Such a twist-preventing contour may, for example, be a polygonal contour which is formed on the outer circumference of the flange portion (or on the inner circumferential portion of the latching part).

Furthermore, the latching part may have at least one latching lug on which the stop part acts.

The latching lug may be fixed in the circumferential direction and in the axial direction with respect to the stud, but with preference can be radially deflected to obtain a latching engagement between the latching part and the stop part.

A plurality of such latching lugs that are spaced apart from one another in the circumferential direction are provided on the latching part. In the same way, a plurality of latching noses that are arranged such that they are distributed in the circumferential direction and engage axially behind the flange portion are provided with preference.

The latching part and/or the stop part may be produced from a plastic, for example, by an injection-moulding process.

The stop part may have a shroud portion which covers over the latching part, at least one latching groove which cooperates with the latching lug to fix the stop part in a latching manner in the circumferential direction being formed on an inner circumferential surface of the shroud portion.

However, a latching effect between the latching part and the stop part can also be created by latching grooves being formed on the latching part and latching lugs being formed on the stop part.

According to another embodiment, the stop part has such a latching groove which is formed as a longitudinal groove, that is to say extends essentially parallel to the longitudinal extent of the stud.

Such a stop part can be easily produced by the injection-moulding process.

Furthermore, the stop part may have a fit-facilitating portion, past which a latching lug is guided when the stop part is screwed onto the stud, to be precise until the latching lug acts on the latching groove.

In this way it is first possible to achieve reliable and easy screw engagement between the stop part and the stud before the latching engagement between the stop part and the latching part is set up.

This fit-facilitating portion may be formed in such a way that the latching lug does not act on the stop part at all in this region.

The fit-facilitating portion may have a fitting latching groove which is aligned with the latching groove of the stop part and has a greater depth than the latching groove.

In this way, a latching effect between the stop part and the latching part that can be overcome with little expenditure of force on account of the greater depth of the fitting latching groove is also achieved during the screwing-on operation.

The depth of the fitting latching groove may, for example, be formed such that a worker can screw the stop part onto the stud by hand until the latching lug engages in the actual latching groove (fixing latching groove).

The depth of the fixing latching groove may in this case be chosen such that turning of the stop part is no longer possible by hand, but can only be obtained by means of a tool.

The stop part may have at least one depression for placing a tool.

Such a depression may, for example, be formed on a head portion of the stop part.

As an alternative to this, it is also possible to make the stop part essentially smooth on the outside.

In the case of this embodiment, a tool which acts with frictional engagement on the outer circumference of the stop part is used for the latching adjustment of the stop part.

According to another embodiment, a plurality of markings spaced apart in the circumferential direction are formed on the outside of the stop part.

These markings may, for example, be numbers. This measure allows better orientation for the worker to be obtained during the screwing-on operation.

Furthermore, the stop part may be connected to an elastic buffer part or damping part.

In the case of this embodiment, it is possible to form the stop arrangement in such a way that it cooperates directly with the other component. In other words, for example, a stop face of a tailgate can be pressed directly onto the elastic buffer part of the stop part to keep it in place under tension without any rattling.

The buffer part and the stop part may be produced by a two-component injection-moulding process, so that the buffer part and the stop part are formed in one piece with each other.

However, it is also conceivable to adhesively bond the buffer part to the stop part or connect them in some other way.

The stop arrangement may have a latching part which is fixed to the stud.

As an alternative to this, however, it is also possible that the stud has a latching face on which the stop part is supported in a latching manner in the circumferential direction.

According the stop arrangement can be obtained with only two components.

In the case of the method according to the invention, it is preferred if the stud, the latching part and the stop part are made to match one another in such a way that the stop part can first be screwed onto the stud with little expenditure of force, until the stop part and the latching part come into latching engagement.

Latching engagement is meant here to mean any latching engagement that leads to final fixing of the stop part with respect to the stud in the circumferential direction.

It goes without saying that the features mentioned above and those still to be explained below can be used not only in the combination respectively specified but also in other combinations or on their own without departing from the scope of the present invention.

BRIEF DESCRIPTION OF THE DRAWINGS

Exemplary embodiments of the invention are explained in more detail in the description which follows and are represented in the drawing, in which.

DETAILED DESCRIPTION OF EXEMPLARY EMBODIMENTS OF THE INVENTION

Figure 1:
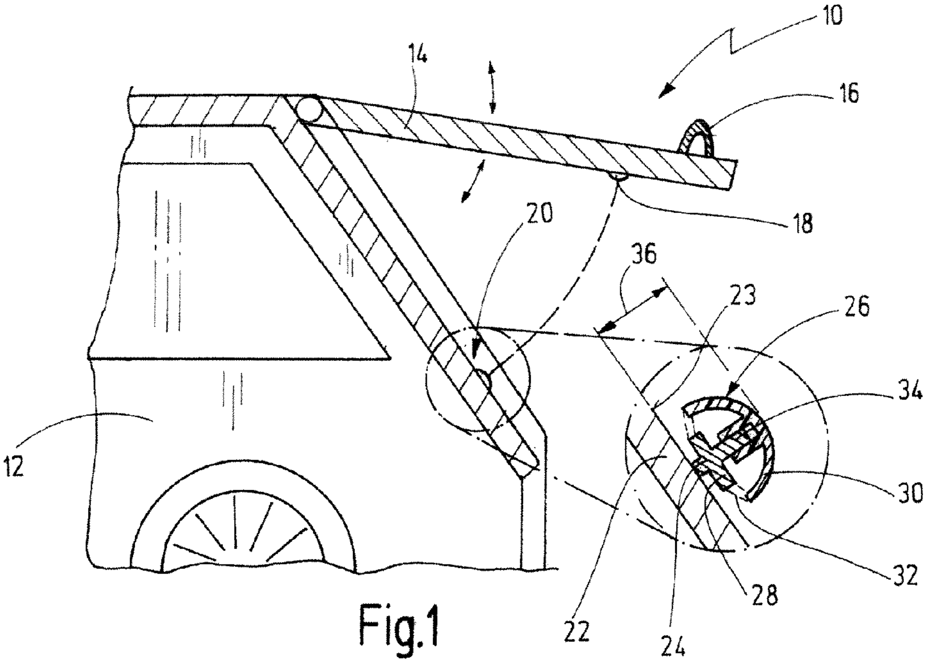
FIG. 1 shows a schematic representation of a rear part of a motor vehicle with an open tailgate and a stop arrangement according to the invention.

In FIG. 1, a motor vehicle such as a passenger car is denoted generally by 10.

The motor vehicle 10 has a body 12, on which a flap such as a tailgate 14 is pivotably hinged. In the closed state, the flap 14 closes an opening in the body 12, such as for example a boot opening. For pivoting of the flap 14, a handle 16 is provided.

In the closed state, the flap 14 is locked with respect to the body 12 by means of a lock that is not represented. On account of the fabrication tolerances in the production of the body 12 and the flap 14, rattling noises may occur but can be easily prevented by maintaining slight tension between the flap 14 and the body 12 in the closed state of the flap 14.

For this purpose, a buffer element 18 (such as for example a rubber stopper) is fixed to the inner side of the flap 14. Furthermore, a stop arrangement 20, the height of which is adjustable, is fixed to the body 12. In the closed state, the elastic buffer element 18 presses against the upper side of the stop arrangement 20 to obtain the aforementioned state of tension.

It goes without saying that the buffer element 18 may also be attached to the body 12 and the stop arrangement 20 attached to the flap 14.

The stop arrangement 20, as it is represented in an enlarged manner in FIG. 1, comprises a fastening element 24 in the form of a stud, which is joined onto a surface 23 of a panel 22 of the body 12. With preference, the stud 24 is joined onto the surface 23 by the stud welding method.

The stop arrangement 20 has, furthermore, a stop part 26, which is connected to the stud 24 by means of a screw connection and covers the said stud in the manner of a shroud.

The stud 34 has a flange portion 28 with an external thread, which projects radially with respect to a shank portion 34 of the stud 24. The stop part 26 has an internal thread and a shroud portion 30, which covers over the stud 24, up to and including the flange portion 28, to create an aesthetically attractive appearance.

As represented by dashed lines in FIG. 1, a latching portion 32, which enters into latching engagement with a portion of the flange portion 28 to fix the stop part 26 in different rotational or screwing positions on the stud 24, may be provided on the shroud portion 30 for fixing purposes. By this adjusting operation, the height 36 between the surface 23 and the upper side of the stop part 26 can be set. By this adjustment it is consequently possible to compensate for vehicle-specific tolerances, in order to be able to set precisely the desired tension in the closed state of the flap 14 individually for each vehicle.

The stop arrangement 20 may be obtained with few components (the stud 24 and the stop part 26). The measure of joining the fastening element 24 in the form of the stud merely to the surface 23 of the panel 22 means that it is not necessary to provide an opening for the stop arrangement 20 in the panel 22. Accordingly, there are no sealing or corrosion problems. Moreover, the stop part 26 can be easily exchanged should it be damaged for any reason. Furthermore, fitting is made easy, since the stud 24 can be applied with preference in an automated manner, to be precise by the stud welding method. It is subsequently easily possible for the stop part 26 to be screwed on by a worker and subsequently fixed in the rotational position specific to the vehicle (vehicle-specific height 36) (for example by means of the latching portion 32 or in some other way).

The stud 24 is preferably made of metal. The stop part 26 is preferably a plastic part, which is in particular produced by the injection-moulding process. The stop part 26 may be formed as a rigid plastic part. However, it is also possible to fasten a buffer part or damping part to the stop part 26. In this case, it may not be necessary to provide a separate buffer element 18 on the other component (here the flap 14). In this case, rather, a face of the flap 14 may butt directly against the elastic buffer part of the stop part 26.

Further embodiments of stop arrangements according to the invention are explained on the basis of the figures that follow. These further embodiments generally correspond with regard to their structure and functional principle to the stop arrangement 20 of FIG. 1. The same elements are therefore provided with the same reference numerals. Hereafter, only the differences are discussed.

Figure 2:
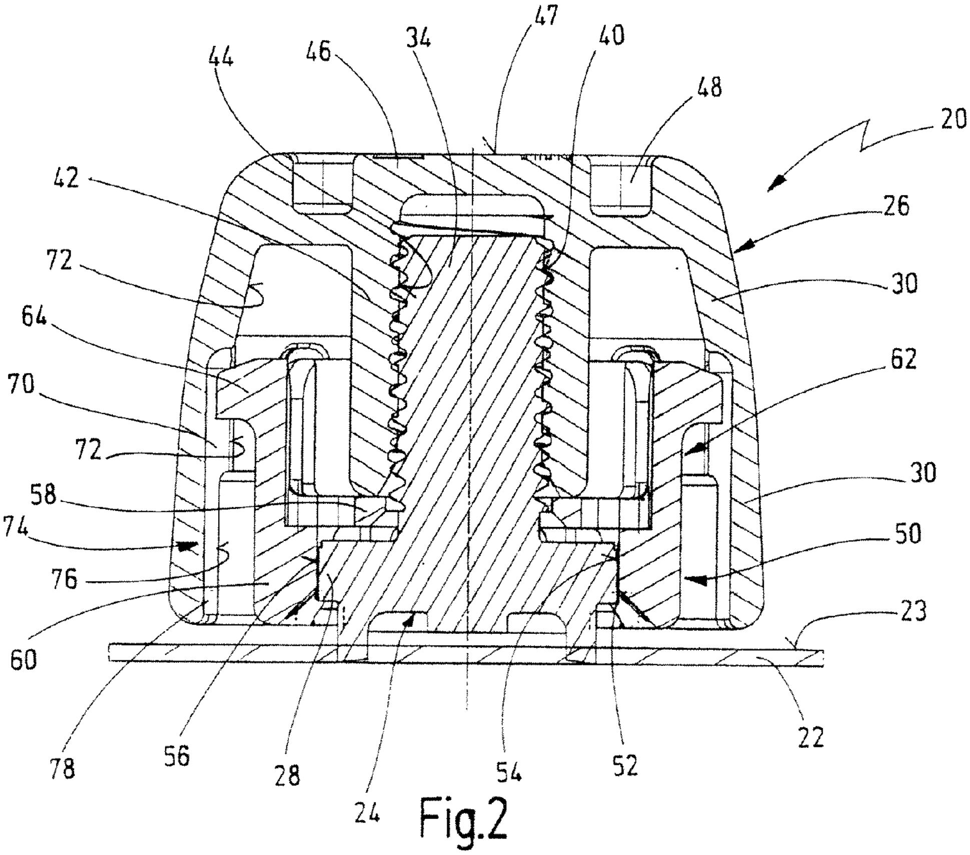
FIG. 2 shows an alternative embodiment of a stop arrangement according to the invention in cross section.

The stop arrangement 20 shown in FIG. 2 has a stud 24 with a first threaded portion 40 in the form of an external thread on the shank portion 34. The stop part 26 comprises a central portion 42 in the form of a hollow portion, in which a second threaded portion 44 is formed as an internal thread. The central portion 42 is connected to a head portion 46, which terminates the central portion 42 in the upper direction and goes over into the shroud portion 30 in the radial direction.

The outer side of the head portion 46 is formed as a stop face 47. Furthermore, a plurality of depressions 48 for placing a tool are provided in the head portion 46.

Apart from the stud 24 and the stop part 26, the stop arrangement 20 comprises a latching part 50. The latching part 50 is fixed on the stud 24 in the axial direction and in the circumferential direction before the stop part 26 is screwed onto the stud 24. The shroud portion 30 of the stop part 26 is formed in such a way that it also covers over the latching part 50.

Figure 3:
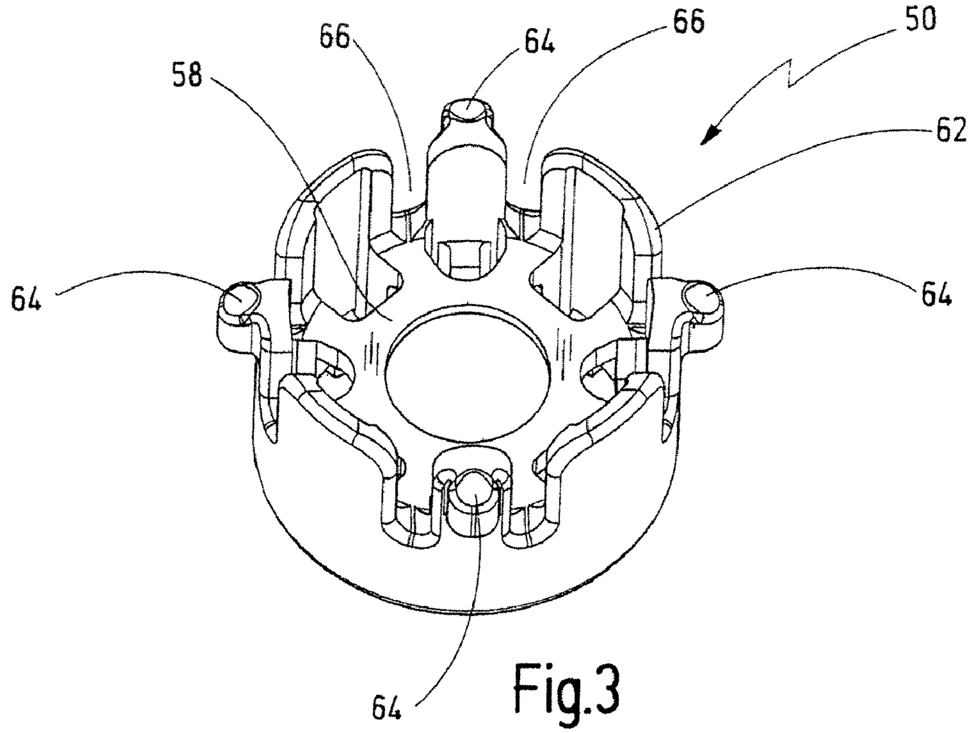
FIG. 3 shows a perspective view of a latching part of a stop arrangement according to the invention obliquely from above.
Figure 4:
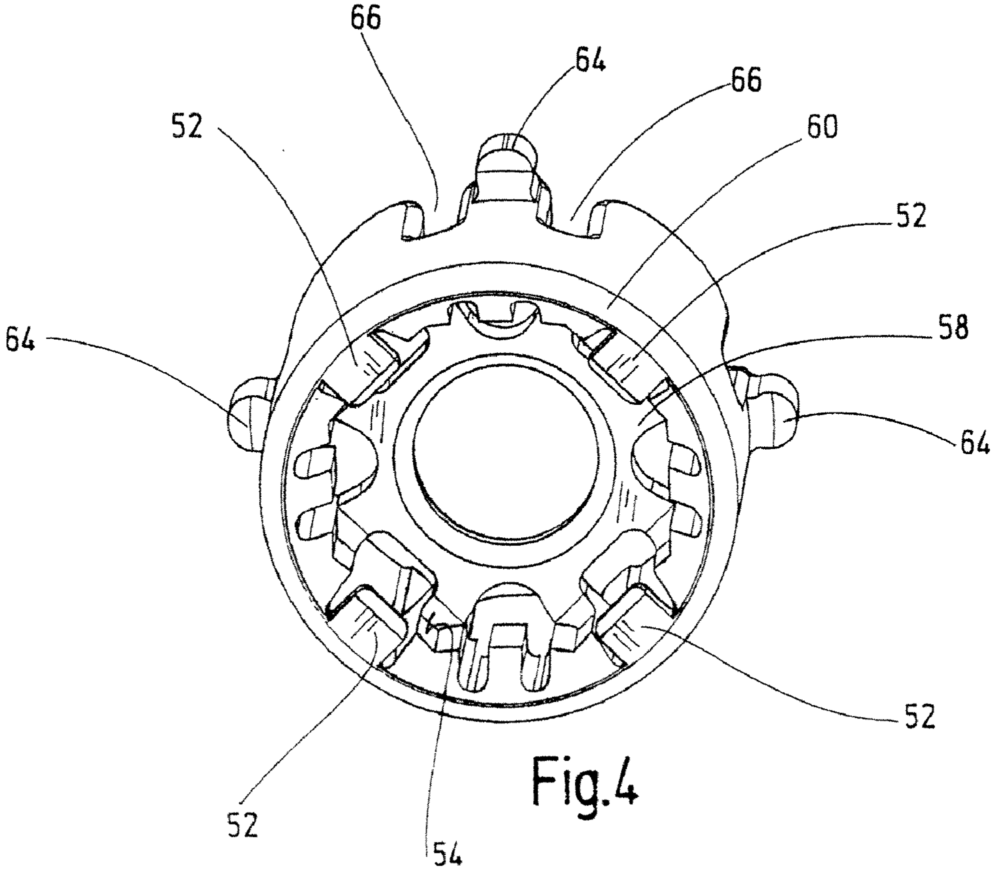
FIG. 4 shows the latching part of FIG. 3 obliquely from below.

The latching part 50, which is represented in more detail in FIGS. 3 and 4, has for this purpose a plurality of latching noses 52, which engage radially behind an underside of the flange portion 28 of the stud 24. Furthermore, the underside of the latching part 50 is formed with a receptacle for the flange portion 28. The flange portion 28 has a twist-preventing contour 56, for example in the form of a polygon. In a corresponding way, the recess of the latching part 50 is likewise circumferentially formed with a twist-preventing contour 54 in the form of a polygon. Accordingly, the latching part 50 can be fixed on the stud 24 only in certain rotational positions, to be precise by simple clipping on, the latching noses 52 engaging behind the flange portion 28.

The latching part 50 has a bottom portion 58, which in the clipped-on state is arranged above the upper side of the flange portion 28. The bottom portion 58 thereby limits the extent to which the stop part 26 can be screwed onto the stud 24. In FIG. 2 it is shown how an underside of the central portion 42 rests on the upper side of the bottom portion 58 to obtain this kind of limitation.

Extending downwards from the bottom portion 58 is a round web 60, which covers over the outer circumference of the flange portion 28 and on the underside of which the latching noses 52 are provided. Also extending upwards from the bottom portion 58 is a ring portion 62. The ring portion 62 is provided with a plurality of latching lugs 64, to be precise by axial recesses 66 which respectively delimit a latching lug 64. The latching lugs 64 can consequently be deflected in the radial direction in order to obtain a latching engagement with the stop part 26.

Figure 5:
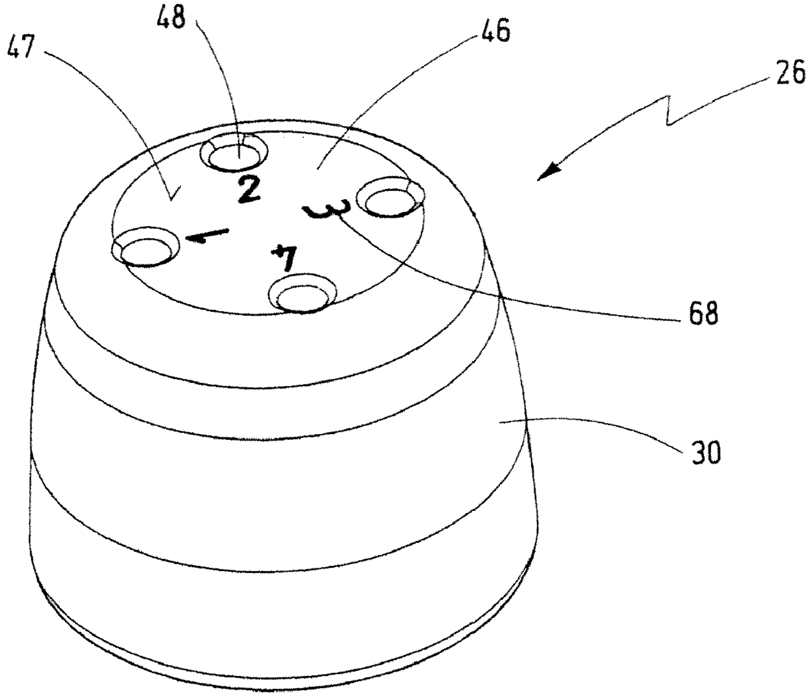
FIG. 5 shows a perspective presentation of a stop part of a stop arrangement according to the invention obliquely from above.
Figure 6:
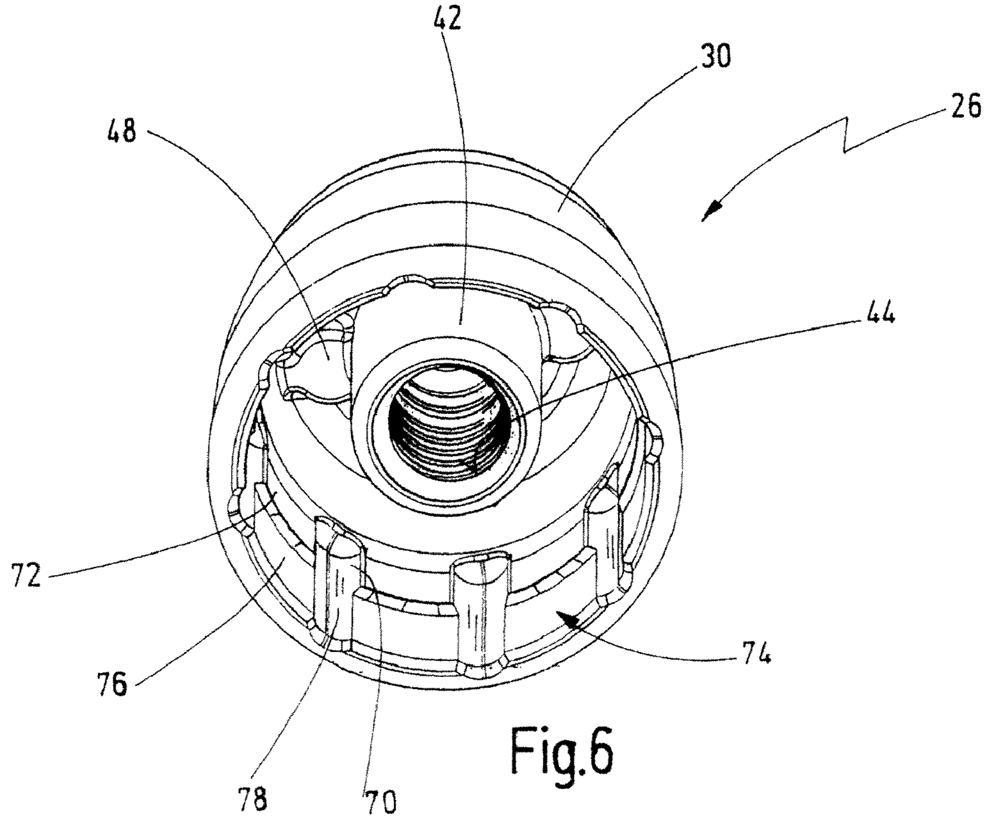
FIG. 6 shows the stop part of FIG. 5 obliquely from below.

The stop part 26 is represented in more detail in FIGS. 5 and 6. Provided on the outer side, in particular on the stop face 47, are a plurality of markings 68 arranged offset in the circumferential direction, for example in the form of numbers. The markings 68 facilitate the orientation of a worker when setting the stop arrangement 20.

As can be seen in particular in FIG. 6, a plurality of longitudinal extending latching grooves 70 are provided on the inner side of the shroud portion 30. The inner circumferential surface on which the latching grooves 70 are provided is denoted by 72 in FIGS. 2 and 6.

Consequently, a latching engagement can be created between the latching grooves 70 and the latching lugs 64. The latching effect is in this case designed such that turning of the stop part 26 with respect to the bottom 24 is essentially no longer possible by hand but can only be carried out by means of a tool. In this way, a setting of the height 36 is finally fixed by the latching engagement. Consequently, once the height 36 has been set, a vehicle user can no longer readily change it subsequently.

Being formed as longitudinal grooves allows the latching grooves 70 to ensure the latching engagement in different rotational positions of the stop part 26.

A fit-facilitating portion 74 is also provided on the underside of the shroud portion 30. The fit-facilitating portion 74 has a set-back inner circumferential surface 76, which is provided in a lower region of the shroud portion 30. Furthermore, a plurality of fitting latching grooves 78, which are aligned in the longitudinal direction with the latching grooves 70 (fixing latching grooves), are provided in the set-back inner circumferential surface 76.

The latching effect between the fitting latching grooves 78 and the latching lugs 64 is reduced by the set-back inner circumferential surface 76. Accordingly, the screwing of the stop part 26 onto the stud 24, with the set-back inner circumferential surface 76 first coming into contact with the latching lugs 64, can be easily obtained, so that this operation can, for example, be carried out manually by a worker. In general, the fit-facilitating portion 74 may also be formed in such a way that the latching lugs 64 do not come into engagement with the shroud portion 30 at all in this region. However, the easy engagement between the fitting latching grooves 78 and the latching lugs 64 allows the worker who is performing the height adjustment to be given a feeling of how many turns must typically be made until the latching lugs 64 come into engagement with the fixing latching grooves 70. From this point in time, as stated, the worker must generally use a tool for the adjustment.

In the embodiment represented in FIGS. 2 and 5, the stop face 47 is provided with the depressions 48 for placing such a tool. If a closed surface is desired for aesthetic reasons, it is also possible to dispense with the depressions 48. In this case, a frictionally engaging tool, which for example acts with frictional engagement on the outer circumference of the shroud portion 30, is used as the tool.

Figure 7:
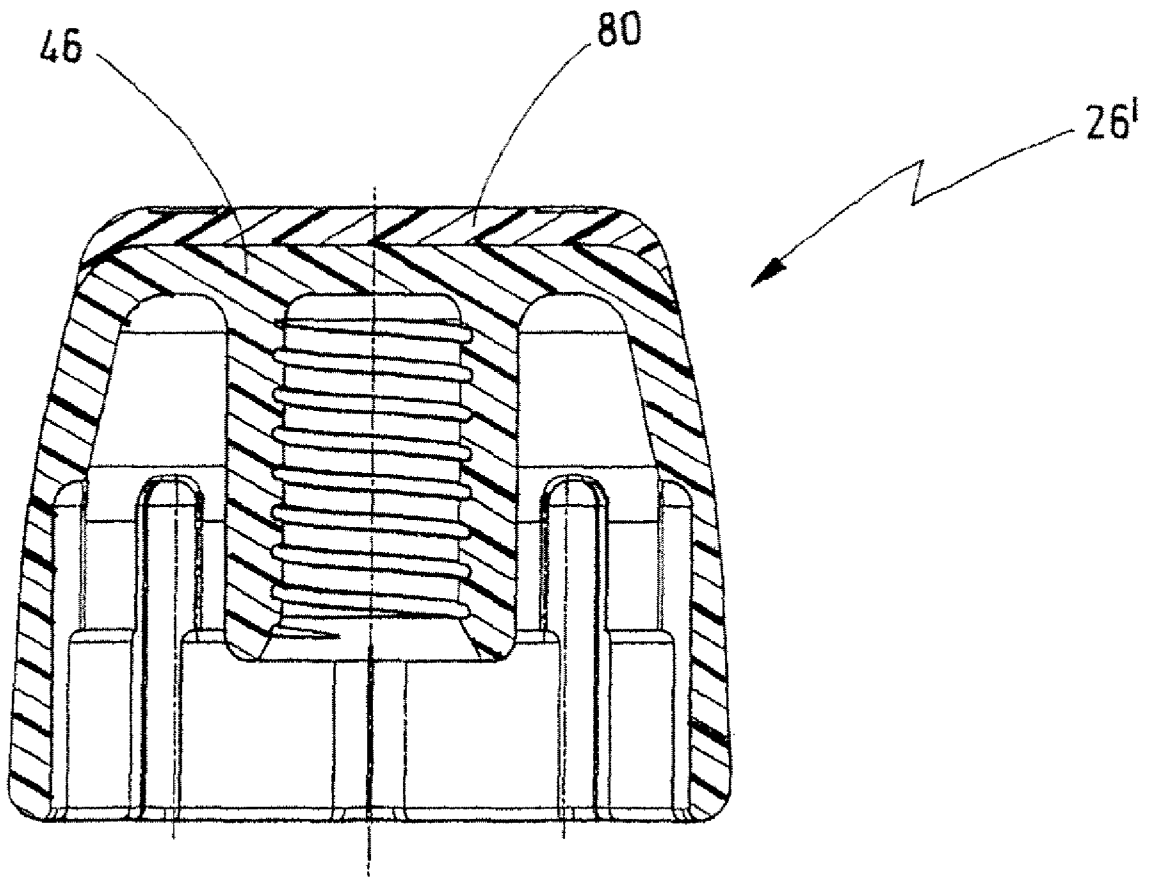
FIG. 7 shows a cross-sectional view of an alternative embodiment of a stop part of a stop arrangement according to the invention with an integrated buffer part.

In FIG. 7, a further alternative embodiment of a stop part 26' is shown.

The stop part 26' corresponds generally in its structure and functional principle to the stop part 26 of FIGS. 2 to 6. However, in the case of the stop part 26', a buffer part 80 is applied to the upper side of the head part 46 and firmly connected to it. The connection may be made, for example, in such a way that the buffer part 80 is produced together with the stop part 26' from an elastic polymer material in a two-component injection moulding process.

Altogether, depending on the embodiment described above, a stop arrangement 20 that can be created with a small number of individual parts is obtained. The stop arrangement 20 can generally be produced at low cost and can be easily fitted. Furthermore, a watertight system that does not present any problems with regard to sealing and/or corrosion is obtained.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A stop assembly comprising:
- a stop part including:
  - a central portion having an internal thread;
  - a stop face located at a top end of the central portion and covering the central portion;
  - a shroud portion extending downwardly from an outer circumference of the stop face; and
  - a first attachment part; and
- a latching part including:
  - a bottom portion;
  - a ring portion surrounding and extending upwardly from the bottom portion; and
  - a second attachment part;
- wherein the second attachment part and the first attachment part are latchingly engaged to connect the stop part and the latching part.

2. The stop assembly of claim 1, wherein when the first and second attachment parts are latchingly engaged, the stop part and the latching part can be non-destructively moved with respect to one another only with the use of a tool.

3. The stop assembly of claim 1, wherein the first attachment part comprises grooves formed on an inner circumferential surface of the shroud.

4. The stop assembly of claim 3, wherein the second attachment part comprises lug portions extending outwardly from the ring portion.

5. The stop assembly of claim 1, further comprising a stud; and
- wherein the latching part is fixed on the stud in an axial direction and in a circumferential direction; and
- wherein the internal thread of the central portion is screwed onto an external thread of the stud.

6. The stop assembly of claim 5, wherein the stud has a shank portion and a flange portion which projects from the shank portion in a radial direction; and
- wherein the latching part is fixed to the flange portion.

7. The stop assembly of claim 6, wherein the flange portion and the latching part have twist-preventing countours which fix the latching part on the stud in the circumferential direction.

8. The stop assembly of claim 5, further comprising a panel, wherein the stud is welded to the panel.

9. The stop assembly of claim 8, wherein the panel is part of an automobile vehicle body.

10. The stop assembly of claim 1, wherein the stop face comprises at least one depression.

11. The stop assembly of claim 1, further comprising an elastic buffer part at a top of the stop part.

12. A stop assembly comprising:

a stop part including:

a central portion having an internal thread;

a stop face located at a top end of the central portion; and a first attachment part;

a latching part including:

a bottom portion;

a ring portion surrounding and extending upwardly from the bottom portion; and a second attachment part; and a stud;

wherein the latching part is fixed on the stud in an axial direction and in a circumferential direction; and wherein the internal thread of the central portion is screwed onto an external thread of the stud wherein the second attachment part and the first attachment part are latchingly engaged to connect the stop part and the latching part.

13. The stop assembly of claim 12, wherein when the first and second attachment parts are latchingly engaged, the stop part and the latching part can be non-destructively moved with respect to one another only with the use of a tool.

14. The stop assembly of claim 12, wherein the first attachment part comprises grooves formed on an inner circumferential surface of the shroud.

15. The stop assembly of claim 14, wherein the second attachment part comprises lug portions extending outwardly from the ring portion.

* * * * *